(12) United States Patent
Morra et al.

(10) Patent No.: US 12,365,803 B2
(45) Date of Patent: Jul. 22, 2025

(54) INSPECTABLE COATINGS AND METHODS FOR USING

(71) Applicant: General Electric Company, Schenectady, NY (US)

(72) Inventors: Martin Matthew Morra, Schenectady, NY (US); Rachel Marie Gettings, Albany, NY (US); Erica Sampson, Schenectady, NY (US)

(73) Assignee: General Electric Company, Evendale, OH (US)

( * ) Notice: Subject to any disclaimer, the term of this patent is extended or adjusted under 35 U.S.C. 154(b) by 672 days.

(21) Appl. No.: 16/906,691

(22) Filed: Jun. 19, 2020

(65) Prior Publication Data

US 2021/0395535 A1 Dec. 23, 2021

(51) Int. Cl.
| | | |
|---|---|---|
| *C09D 5/08* | (2006.01) | |
| *C09D 1/00* | (2006.01) | |
| *C09D 5/00* | (2006.01) | |
| *C09D 5/22* | (2006.01) | |

(52) U.S. Cl.
CPC ............... *C09D 5/084* (2013.01); *C09D 1/00* (2013.01); *C09D 5/008* (2013.01); *C09D 5/22* (2013.01)

(58) Field of Classification Search
None
See application file for complete search history.

(56) References Cited

U.S. PATENT DOCUMENTS

| | | | |
|---|---|---|---|
| 4,612,049 A | * | 9/1986 | Berner ............... C09D 5/086 428/458 |
| 4,922,113 A | | 5/1990 | Melancon |
| 6,919,121 B2 | | 7/2005 | Stowell et al. |
| 7,374,821 B2 | | 5/2008 | Leclercq et al. |
| 7,858,952 B2 | | 12/2010 | Feist et al. |
| 8,623,526 B2 | | 1/2014 | Liu et al. |
| 9,297,768 B2 | | 3/2016 | Yager et al. |
| 10,201,831 B2 | | 2/2019 | Sivaramakrishnan et al. |
| 2002/0164417 A1 | | 11/2002 | Khan et al. |
| 2003/0081203 A1 | | 5/2003 | Chen et al. |

(Continued)

FOREIGN PATENT DOCUMENTS

| | | |
|---|---|---|
| CN | 104493114 A | 4/2015 |
| CN | 104607630 A | 5/2015 |

(Continued)

OTHER PUBLICATIONS

English Abstract of Kamimura et al. JP 2002-060676 (Year: 2002).*

(Continued)

*Primary Examiner* — Ronak C Patel
(74) *Attorney, Agent, or Firm* — Dority & Manning, P.A.

(57) ABSTRACT

A coating including a plurality of indicator oxide nanoparticles, a binder, and a wetting agent. A sulfidation corrosion mitigation coating including: a sulfidation corrosion mitigation material, a binder, and a plurality of indicator oxide nanoparticles. An article including a metal alloy substrate having the sulfidation corrosion mitigation coating thereon is also provided. The sulfidation corrosion mitigation coating can include a first indicator layer containing indicator oxide nanoparticles disposed on the surface of the metal alloy substrate. Methods for inspection of an article having a coating containing a plurality of indicator oxide nanoparticles is also provided.

18 Claims, 3 Drawing Sheets

(56) References Cited

U.S. PATENT DOCUMENTS

| | | |
|---|---|---|
| 2004/0214938 A1 | 10/2004 | Ruud et al. |
| 2005/0129972 A1* | 6/2005 | Matsumoto ......... C23C 28/3215 |
| | | 428/632 |
| 2005/0228098 A1 | 10/2005 | Skoog et al. |
| 2007/0048867 A1 | 3/2007 | Farmer |
| 2008/0026248 A1 | 1/2008 | Balagopal et al. |
| 2009/0078155 A1* | 3/2009 | Maze ....................... C09D 5/10 |
| | | 106/287.19 |
| 2010/0119697 A1 | 5/2010 | Baran, Jr. |
| 2016/0208371 A1* | 7/2016 | Wang ..................... C23C 4/134 |
| 2016/0305034 A1 | 10/2016 | Baque et al. |
| 2017/0152421 A1* | 6/2017 | Ohtake ................ B01J 35/0013 |
| 2019/0107499 A1 | 4/2019 | Ellis et al. |

FOREIGN PATENT DOCUMENTS

| | | | |
|---|---|---|---|
| CN | 106917093 A | | 7/2017 |
| CN | 108018516 A | | 5/2018 |
| CN | 108018517 | | 5/2018 |
| CN | 110283487 B | | 6/2020 |
| EP | 2298951 | * | 3/2011 |
| FR | 2867277 A1 | | 9/2005 |
| JP | 2019108888 A | | 7/2019 |
| KR | 20150061404 A | | 6/2015 |

OTHER PUBLICATIONS

Deardorff et al., "Shining a Black Light on Coating Inspections", Photonics Media, Nov. 2010, 6 pages.

Ejaz et al., "Sulfate-vanadate hot corrosion of neodymium cerate/yttria stabilized zirconia composite coating", International Journal of Applied Ceramic Technology, vol. 16, No. 3, US, Dec. 2018 pp. 931-942.

Lashmi et al., "Hot corrosion studies on plasma sprayed bi-layered YSZ/La2Ce2O7 thermal barrier coating fabricated from synthesized powders", Journal of Alloys and Compounds, vol. 711, Jul. 2017, pp. 355-364.

Tabeshfar et al., "Hot corrosion of Gd2Zr2O7, Gd2Zr2O7/YbSZ, YSZ + Gd2Zr2O7/YbSZ, and YSZ thermal barrier coatings exposed to Na2SO4 + V2O5", Surface and Coatings Technology, vol. 409, Mar. 2021, 14 Pages.

Xu et al., "Hot corrosion behavior of rare earth zirconates and yttria partially stabilized zirconia thermal barrier coatings", Surface and Coatings Technology, vol. 204, Issues 21-22, Aug. 2010, pp. 3652-3661.

* cited by examiner

INSPECTABLE COATINGS AND METHODS FOR USING

FIELD

The present disclosure generally relates to a coating containing a plurality of indicator oxide nanoparticles, an article comprising the coating containing a plurality of indicator oxide nanoparticles, and methods for using the coating containing a plurality of indicator oxide nanoparticles.

BACKGROUND

To detect sulfidation corrosion damage under layers of mixed corrosion products and oxidation or under environmental deposits, such as dust, on a coated article, the entire coating must be stripped so that the article can be visually inspected. Stripping of the coating and conducting visual inspection can require substantial amounts of time. Even with the coating stripped, corrosion damage can remain hidden under native oxide layers that grow in conjunction with corrosion products, environmental contaminants, or in the case of sulfidation, over pits. Furthermore, chemical stripping of the entire coating and some of the corrosion products from an article's surface may not be enough to reveal damage beneath extremely adherent corrosion products. Accordingly, additional mechanical methods of surface cleaning maybe required. Such surface preparations increase time for inspection and contribute to material waste, especially in the event that the underlying article is not damaged.

Accordingly, new solutions for inspecting coated articles for corrosion damage are needed.

BRIEF DESCRIPTION

In one aspect, embodiments of the present disclosure relate to a wear or ablative coating, comprising: a binder, a wetting agent, and a plurality of indicator oxide nanoparticles.

In one aspect, embodiments of the present disclosure relate to a sulfidation-type corrosion mitigation coating, comprising: a sulfidation corrosion mitigation material, a binder, a wetting agent, and a plurality of indicator oxide nanoparticles, wherein the coating comprises a first indicator layer having an increased concentration of indicator oxide nanoparticles. In certain aspects, the binder can include an aluminum phosphate binder. In certain embodiments, the sulfidation corrosion mitigation material can include gadolinium doped cerium oxide particles that are catalytic to the decomposition of sulfur-containing compounds.

In another aspect, embodiments of the present disclosure relate to an article comprising a surface having a wear or ablative coating or a sulfidation corrosion mitigation coating thereon.

In yet another aspect, embodiments of the present disclosure relate to a method for inspection of an article, comprising: exposing a surface of the article having the sulfidation corrosion mitigation coating thereon to an environment having a sulfur corrosive material; and utilizing one or more light emitting devices to inspect the article to identify corrosion, oxidation, worn areas of the coating, or mechanically damaged areas of the coating.

BRIEF DESCRIPTION OF THE DRAWINGS

The above and other aspects, features, and advantages of the present disclosure will become more apparent in light of the subsequent detailed description when taken in conjunction with the accompanying drawings in which.

DETAILED DESCRIPTION

Figure 1:
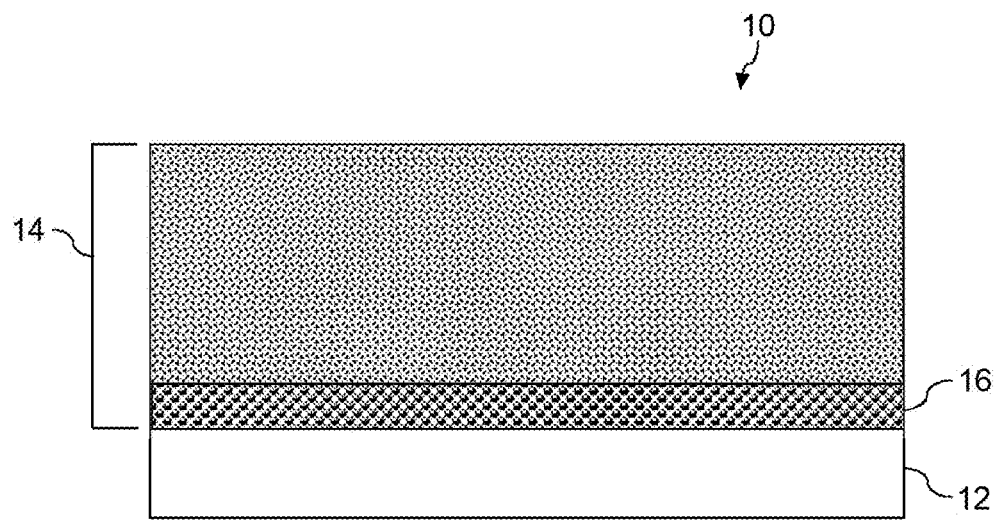
FIG. 1 illustrates an article having the sulfidation corrosion mitigation coating disclosed herein.

One or more embodiments of the present disclosure will be described below. Unless defined otherwise, technical and scientific terms used herein have the same meaning as is commonly understood by one of ordinary skill in the art to which this invention belongs.

The terms "a" and "an" do not denote a limitation of quantity, but rather denote the presence of at least one of the referenced items. Approximating language, as used herein throughout the specification and claims, may be applied to modify any quantitative representation that could permissibly vary without resulting in a change in the basic function to which it is related. Accordingly, a value modified by a term or terms, such as "about", are not to be limited to the precise value specified. Additionally, when using an expression of "about a first value-a second value," the about is intended to modify both values. In at least some instances, the approximating language may correspond to the precision of an instrument for measuring the value.

Here, and throughout the specification and claims, range limitations may be combined and/or interchanged, such ranges are identified and include all the sub-ranges contained therein unless context or language indicates otherwise. Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Here, and throughout the specification and claims the term catalytic oxide indicates an oxide that can catalytically decompose sulfur containing compounds and aerosols in the temperature range 500° C. to about 982° C.

Here, and throughout the specification and claims the term sulfidation corrosion indicates high temperature, above about 500° C., degradation of native protective oxides and oxidation mitigation coatings by sulfur present in solid and liquid compounds, salts, aerosols, and gaseous mixtures. The term mitigation refers to slowing or delaying any deleterious effects sulfur may have on protective native oxides and oxidation mitigation coatings.

The coating of the present disclosure can include, consist essentially of, or consist of, the components of the present disclosure as well as other materials described herein. As used herein, "consisting essentially of" means that the composition or component may include additional materials, but only if the additional materials to not materially alter the basic and novel characteristics of the claimed composition or methods.

Embodiments of the present disclosure relate to a coating, such as a wear or ablative-like coating that can be used in power generation, aviation, and other applications involving corrosive or particle erosion environments, to indicate remaining service life of the articles. The wear or ablative-like coating disclosed herein includes one or more indicator oxides capable of enhancing measurement of remaining service life of the coating during services intervals. For example, in wear or ablative-like coatings, wear debris from articles can be examined for one or more indicator oxides capable of fluorescing under an emitted light source, such as UV light. According, utilization of the indicator oxides describe herein allows for detection of remaining service life of the coating without removing the coating from the article.

Embodiments of the present disclosure also relate to a sulfidation corrosion mitigation coating that can be used in power generation, aviation, and other applications involving corrosive environments, to protect articles such as gas turbine or engine components from sulfur corrosion and thereby significantly improve the service life of the articles. The sulfidation corrosion mitigation coating disclosed herein includes one or more indicator oxides capable of enhancing inspection of the coating and/or underlying substrate during services intervals.

All corrosion mitigation coatings, when exposed to either sulfate containing dusts or aerosolized sulfur compounds at high temperatures, will resist the corrosive effects of sulfur containing species for some time interval. Failure to mitigate will occur when some macro or atomistic defect in the coating initiates a corrosion event in the underlying metal substrate. Sulfur corrosion, e.g., sulfidation, is one example of a typical problem for articles exposed to fuels or materials which comprise corrosive sulfur-containing compounds. Example corrosion events include the initiation of an oxide-containing pit, preferential corrosion or oxidation of a phase in a metallic alloy, an ionic defect in a protective oxide layer that promotes enhanced ionic transport of charged corrosive species, mechanical damage to the substrate that introduces plastic deformation and hence accelerated diffusion of corrosive species, and/or cracks or surface connected porosity in the coating. For some forms of sulfidation, e.g., selective pit formation, initiation can start at temperatures as low as 550° C. to 600° C. The corrosion process can transition to pit link up and produce a uniform corrosion front or continue as isolated large corrosion at temperatures above 700° C. At temperatures higher than about 900° C., sulfidation may disrupt the normal oxidation process of metallic alloys and cause spallation of the protective oxide and attached coating along with internal oxidation of the article.

Because of the effects of sulfur containing solids and aerosolized compounds on mass transport, diffusion, and ionic transport through the coating and underlying protective oxide, corrosion can occur at an unpredictably rapid rate beneath a corrosion mitigation coating. If not detected, corrosion pits and localized corrosion can initiate cracks that propagate into the base material of the article. The mitigation coatings may conceal these indications and so removing the mitigation coating from the article is usually necessary to facilitate inspection. Further, even with the mitigation coating removed, corrosion products are typically oxides that can be similar in appearance and color to the native oxides formed on metallic alloys, and therefore further disguise underlying defects. Currently, visual or optically enhanced inspection of the article or a replicated surface of the article is necessary to identify indications so that repairs can be conducted.

Accordingly, as provided herein, incorporating indicator oxides in wear or ablative type coatings or hot corrosion mitigation coatings, allows for indicator oxides that fluoresce under ultraviolet light to become entrapped in the corrosion products, and move with the corrosion front enabling inspection for corrosion without removing the coating. In many cases critical types of hot corrosion such as pitting are difficult to detect even with the mitigation coating removed and so the fluorescent signature provided by the indicator oxides will enhance detection with or without the corrosion mitigation coating present. Furthermore, because the indicator oxides become incorporated into the products of corrosion and oxidation, they can indicate areas of corrosion events when they fluoresce under UV light inspection.

Additionally, in some embodiments, indicator oxides can be included in the coatings disclosed herein at different levels within the coating itself such that remaining coating thickness can be assessed and time to reapplication can be better predicted.

The coatings described herein include one or more indicator oxide particles, such as one or more indicator oxide nanoparticles. As used herein "indicator oxide" includes an oxide that has fluorescent emission under excitation by visible or infrared light. In certain embodiments, the indicator oxide is capable of fluorescent emission under UV light.

The indicator oxides can be metal oxide nanoparticles. In some embodiments, the indicator oxide nanoparticles comprise nanoparticles of europium oxide or any oxide with a surface decorated by fluorescent metal oxide particles or any oxide that can be doped with an element or elements that will produce a fluorescing effect under an emitted light source, such as UV light. The nanoparticles may be round, square, or in irregular shapes and configurations. In some embodiments, the nominal diameter of the nanoparticles is in a range of from about 5 nm to about 100 nm, from about 5 nm to about 50 nm, or from about 20 nm to about 30 nm.

The coatings disclosed herein can also include one or more binders. Without being bound by any particular theory, the binder included can facilitate adhesion of the indicator oxides and/or catalytic oxides to the underlying metal substrate. In certain embodiments, the binder is a water-base or solvent-base aluminum phosphate. As used herein, the term "aluminum phosphate" refers to any solution comprised of aluminum and phosphorus that is capable of bonding with oxide particles, such as indicator oxides or oxides that are catalytic to the decomposition of sulfur containing compounds. In some embodiments, the aluminum phosphorus oxide has a phase of $AlPO_4$.

In some embodiments, the binder can include an aluminum phosphate solution containing submicron-sized oxides or oxide nanoparticles in suspension. The described binder containing oxides can be applied to an article and, when cured in the temperature range from 200° C. to 580° C., will bond with the oxide particles and the surface of the article. The binder described is resistant to sulfidation in the temperature range 500° C. to about 982° C.

In some embodiments, the composition for preparing the coating includes a surfactant or wetting agent. In some embodiments, the wetting agent comprises one or more organic phosphate esters. In certain embodiments, the wetting agent comprises Victawet® available from REMET® Corporation. In some embodiments, the wetting agent comprise one or more organic sulfonic acid salts. In certain embodiments, the wetting agent comprises Nalco® 7667.

In certain embodiments, the coating is a sulfidation corrosion mitigation coating including a sulfidation corrosion mitigation material. The sulfidation corrosion mitigation material can include any oxide that is catalytic to the decomposition of sulfur-containing compounds. In certain embodiments, the sulfidation corrosion mitigation material includes any oxide that is catalytic to the decomposition of sulfur-containing compounds at temperatures ranging from about 400° C. to about 800° C., such as about 500° C. In certain embodiments, the sulfidation corrosion mitigation material comprises cerium oxide or noble metal decorated cerium oxide, or any combination thereof. In some embodiments, the sulfidation corrosion mitigation material is in the form of a powder.

In some embodiments, the cerium oxide comprises a dopant selected from gadolinium (Gd), yttrium (Y), lanthanum (La), samarium (Sm), calcium (Ca), magnesium (Mg), barium (Ba), strontium (Sr), scandium (Sc), praseodymium (Pr), ytterbium (Yb), neodymium (Nd), holmium (Ho), dysprosium (Dy), erbium (Er), and any combination thereof.

In some embodiments the sulfidation corrosion mitigation material can include an oxide that has been doped so that it is capable of fluorescing under an emitted light source, such as UV light. Accordingly, in certain embodiments the sulfidation corrosion mitigation material can comprise the indicator oxide.

As used herein, the term "noble metal decorated cerium oxide refers to a cerium oxide coated with at least one noble metal to enhance catalytic activity, in which nanometer-scale or micrometer-scale particles of the at least one noble metal is deposited on the surface of the cerium oxide. At least one noble metal may be introduced on to the cerium oxide by any method applicable for causing the particles of at least one noble metal disposed on the surface of the oxide. Examples of applicable methods include vapor deposition, chemical plating from noble metal salts, and chemical vapor deposition methods. In some embodiments, the noble metal is introduced on to the surface of the oxide by immersing the oxide in a solution of the noble metal salt. In some embodiments, the noble metal is introduced to the cerium or oxide by mixing and ball-milling the cerium oxide particle and noble metal particle together.

The term "noble metal" refers to a collection of the platinum group metals (PGM), including platinum (Pt), palladium (Pd), osmium (Os), iridium (Ir), ruthenium (Ru) and rhodium (Rh). In some embodiments, the noble metal on the noble metal decorated cerium oxide comprises Pt, Pd, or a combination thereof. In some embodiments, a weight percentage of the noble metal(s) relative to the noble metal decorated cerium oxide is in a range from about 0.01 weight percent to about 50 weight percent, or from about 0.01 weight percent to about 15 weight percent.

In some embodiments, the noble metal decorated cerium oxide comprises a dopant selected from Gd, Y, La, Sm, Ca, Mg, Ba, Sr, Sc, Pr, Yb, Nd, Ho, Dy, Er, and any combination thereof.

In some embodiments, the noble metal decorated cerium oxide comprises a dopant selected from Gd, Y, La, Sm, Ca, Mg, Ba, Sr, Sc, Pr, Yb, Nd, Ho, Dy, Er, and any combination thereof. In some embodiments the noble metal decorated cerium oxide may be doped so that it is capable of fluorescing under an emitted light source, such as UV light, and is an indicator oxide.

The noble metal decorated cerium oxide may provide or improve the catalytic activity for the decomposition of sulfur-containing compounds or aerosols by the cerium oxide. Moreover, the cerium oxide decorated with the noble metal may have improved surface morphology and increased surface area to enhance catalytic activity. Therefore, the noble metal decoration on the cerium oxide may contribute to improving both the catalytic activity for the decomposition of sulfur-containing compound and aerosols and the surface morphology of the anti-corrosion material.

A weight ratio of all liquid and solid ingredients to the whole composition for preparing the sulfidation corrosion mitigation coating, that is, the solid loading, and a weight ratio of the metal oxide nanoparticles to all solid ingredients in the composition for preparing the sulfidation corrosion mitigation coating, that is, the particle ratio, may be adjusted to obtain coatings with different viscosities and hence thicknesses, different coefficients of thermal expansion to match those of the substrate metals. for use in different applications. In some embodiments, the solid loading is in a range of from about 10 weight percent to about 25 weight percent, or from about 25 weight percent to about 40 weight percent. In some embodiments, the solid particle ratio in the liquid binder phase is in a range of from about 10% to about 40%, or from about 10% to about 30%.

Solid loading of indicator oxides is some fraction of the total allowed solid loading including catalytic oxide particles. In some embodiments the coating can be just an indicator layer where the indicator oxides can be 100% of the allowed total solid loading or up to 40 wt. % in the liquid binder phase with no catalytic oxides added. In some embodiments the indicator oxides can be added to the liquid binder phase containing catalytic oxides ranging in solid loading from about 5 wt. % to about 15 wt. %.

In some embodiments, the composition for preparing the sulfidation corrosion mitigation coating comprises a solvent. In some embodiments the solvent comprises water. The weight percent water added can range from about 30 wt. % to about 35 wt. %.

In some embodiments, the sulfidation corrosion mitigation coating may be directly applied on a surface confronting the sulfidation corrosive (the target surface). In such embodiments, the sulfidation corrosion mitigation coating can include a first indicator layer containing an indicator oxide or oxides that can be applied directly on the surface of an article. The indicator layer can subsequently be heat treated to sinter the particles to each other and/or a pre-oxidized metal target surface. Post heat treatment, additional layers of the sulfidation mitigation coating can be applied on top of the indicator layer. In some embodiments, the sulfidation corrosion mitigation coating may be applied to the target surface via an interfacial bonding oxide layer, for example, pre-oxidation of a metal surface to produce a native oxide layer or an engineered oxide layer created in a controlled atmosphere furnace.

The sulfidation corrosion mitigation coating may be applied to the target surface via various coating processes, for example, spraying or deposition processes. In some embodiments, the slurry of the composition for preparing the sulfidation corrosion mitigation coating may be applied to the target surface by an ultrasonic spray process or a wet-chemical deposition process, or a combination thereof. The term "wet-chemical deposition process" refers to a liquid-based coating process involving the application of a liquid precursor film on a substrate that is then converted to the desired coating by subsequent thermal treatments. Some examples of wet-chemical deposition methods include dip coating methods, spin coating methods, spray coating methods, die coating methods, and screen-printing methods.

In some embodiments, the sulfidation corrosion mitigation coating may be applied to the target surface via ultrasonic spraying or conventional air gun spraying. Ultrasonic spraying may be beneficial in that it allows for controlled application of fine or very thin layers of the sulfidation corrosion mitigation coating or the indicator oxide layer coating or neat indicator oxide particles. For example, ultrasonic spraying can be utilized to apply the first indicator layer on the substrate's surface composed of the indicator oxide, binder, and wetting agent. This can be followed by the sulfidation corrosion mitigation coating. Different indicator oxides can be incorporated into the sulfidation corrosion mitigation coating slurry and deposited as separate layers at fixed distances between layers of the sulfidation corrosion mitigation coating. Additionally, ultrasonic spraying can be utilized to include different materials, such as indicator oxides, at different depths within the sulfidation corrosion mitigation coating.

In some embodiments, the sulfidation corrosion mitigation coating on the surface of the article may be prepared from a slurry composed of the binder, catalytic oxide or oxides, and wetting agent. In some embodiments, the slurry is prepared by blending the sulfidation corrosion mitigation coating composition by planetary ballmilling or vortex mixing.

In some embodiments, the coating of the surface of the article is prepared by applying the slurry to the surface of the article through dip-coating or screen printing.

In some embodiments, preparing the coating comprises curing the coating in air at a temperature in a range from about 204° C. to about 580° C.

The coating may be of any practical thickness that will prevent cracking or delamination of the coating during curing or impact low cycle fatigue life. In some embodiments, the coating has a thickness of about 1-15 μm. In certain embodiments, the coating may have a thickness of from about 1 μm to about 30 μm, such as from about 5 μm to about 20 μm.

The article according to embodiments of the present disclosure may be any article that comprises a surface having a coating exposable to an environment comprising a sulfur corrosive, such as a corrosive sulfur containing solid, liquid, or aerosol species. The article may include a metal substrate or a substrate having a metallic layer that has a surface exposed to a corrosive sulfur containing species. The metallic substrate may comprise any suitable metals or alloys, including but not limited to nickel-based and cobalt-based alloy alloys. In some embodiments, the surface of the article is a nickel-based superalloy substrate, a cobalt-based superalloy substrate, or any combination thereof. In some embodiments, the article is component of an aviation system or a power system, such as gas turbine or engine component.

The term "sulfur corrosive" used herein may generally refer to a material which comprises a sulfur containing solid compound, liquid, or aerosol that is corrosive at temperatures from about 500° C. to 982° C. In some embodiments, the sulfur corrosive comprises other material(s), such as dust, or liquids, gases, or aerosols besides a sulfur comprising material. The sulfur comprising material may change in form among, for example, sulfide, sulfate, sulfur dioxide, and sulfur trioxide, according to the environment and corrosion reaction. In some embodiments, the sulfur comprising material comprises sodium sulfur ($Na_2SO_4$), potassium sulfur ($K_2SO_4$), magnesium sulfur ($MgSO_4$), calcium sulfur ($CaSO_4$), or any combination thereof.

In some embodiments, the environment is at an elevated temperature. The term "elevated temperature" used herein may generally refer to a temperature which is higher than normal, for example, higher than the ambient temperature. In some embodiments, the "elevated temperature" refers to an operation temperature in power generation, aviation, or other applications involving hot and corrosive environment. For example, the elevated temperature may refer to an operation temperature in gas turbines or engines, such as a jet engine. In some embodiments, the elevated temperature refers to a temperature higher than about 500° C. As envisioned for this indicator containing sulfidation mitigation coating service range, the elevated temperature is in a range from about 500° C. to about 982° C.

In addition, the sulfidation corrosion mitigation coating according to embodiments of the present disclosure will mitigate sulfidation corrosion, for example, at an elevated temperature.

Exemplary coatings and articles containing the coatings will be discussed herein with reference to FIGS. 1-6.

FIG. 1 illustrates an article 10 having the sulfidation corrosion mitigation coating 14 thereon. The article 10 includes a metal-based substrate 12 having the sulfidation corrosion mitigation coating 14 thereon. The sulfidation corrosion mitigation coating 14 can include one or more indicator oxide particles that form an indicator layer 16 located on the surface of the substrate 12. The indicator layer 16 can include an increased concentration of indicator oxide particles. For example, in some embodiments, the indicator layer 16 includes an increased amount of indicator oxides as compared to the rest of the coating. In some embodiments, the indicator layer 16 can includes an increased amount of indicator oxides as compared to sulfidation corrosion mitigation material. Still, in certain embodiments indicator oxides may only be found in the indicator layer 16 and are not found throughout the rest of the sulfidation corrosion mitigation coating 14.

In certain embodiments, the sulfidation corrosion mitigation coating 14 can be a multi-layered coating. In such embodiments, the first indicator layer 16 is disposed on the surface of the substrate 12, such as a metal-based substrate. The first indicator layer 16 can include one or more binders, such as an aluminum phosphorus oxide. Additional layers of sulfidation corrosion mitigation coating 14 containing sulfidation corrosion mitigation material can then be applied to the first indicator layer 16, until the desired coating thickness is achieved. For example, in some embodiments a plurality of additional layers of the sulfidation corrosion mitigation coating containing a sulfidation corrosion mitigation material and binder can be layered on top of the first indicator layer 16.

Figure 2:
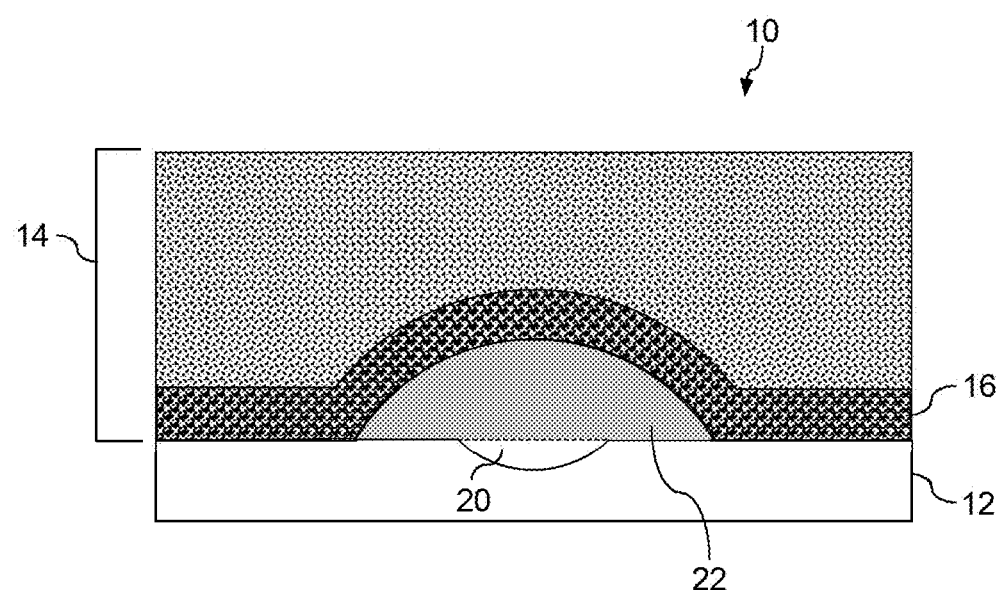
FIG. 2 illustrates a damaged article having a sulfidation corrosion pit and resulting pit cap on a surface of the article under the sulfidation corrosion mitigation coating disclosed herein.

Referring now to FIG. 2, damage, such as pitting corrosion, can occur to article 10 during use. For example, the substrate 12 has a damaged area 20, such as a corrosion pit. A cap 22 is formed over the damaged area 20. During the corrosion process that forms the damaged area 20, such as a pit, charge balance must be maintained between negatively charged species and positively charged species. For example, as negatively charged species, e.g., sulfur and oxygen, are transported into the substrate positively charged species, e.g. cobalt and nickel, are transported to the surface of the substrate where they react with oxygen to form oxides. Oxidation of these positively charged species, such as nickel and cobalt ions, cause a volumetric expansion that produces a raised feature, or oxide cap, over the pit. Due to the lifting effect caused by volumetric expansion by oxide formation the coating above the pit is lifted as well. Formation and enlargement of the cap 22 forces the indicator layer 16 closer to the surface of the sulfidation corrosion mitigation coating 14 and away from the substrate 12. As the damaged area 20 grows deeper and/or wider, the cap 22 also grows, which continues to push or raise the indicator layer 16 away from the substrate 12 and closer to the surface of the coating. Raising the indicator layer 16 via the cap 22 allows for the indicator oxides to be detected under a light emitting source, such that the damaged area 20 can be visually identified. Accordingly, damaged areas 22 on the substrate 12 can be detected without having to remove the sulfur corrosion mitigation coating 14 from the article 10.

Figure 3:
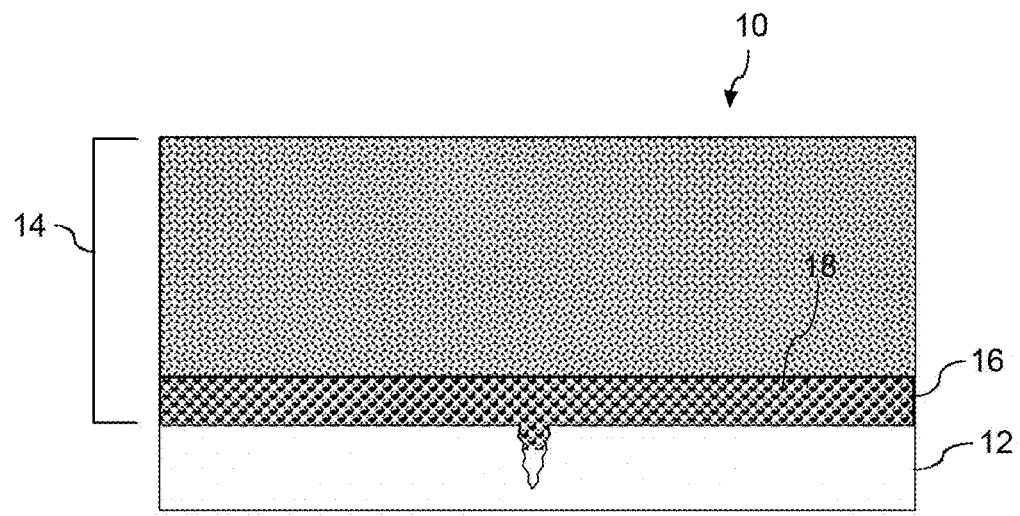
FIG. 3 illustrates a damaged article having the sulfidation corrosion mitigation coating disclosed herein.
Figure 4:
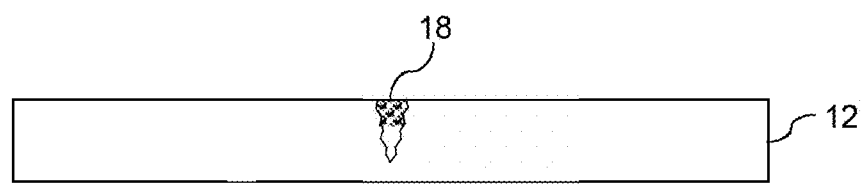
FIG. 4 illustrates a damaged article having the sulfidation corrosion mitigation coating removed.

Referring now to FIG. 3, an article 10 is shown having a metal alloy substrate 12 with a sulfidation corrosion mitigation coating 14 thereon. The sulfidation corrosion mitigation coating 14 includes an indicator layer 16 containing one or more indicator oxides 18. The substrate 12 includes a damaged area 20, such as a crack or fissure. Upon the formation of the damaged area 20, one or more indicator oxide particles 18 from the indicator layer 16 may penetrate the damaged area 20 during thermal cycling of the article 10. Such thermal cycling can include cooling the article down to ambient temperature after operation of the article at a high operation temperature. Upon stripping the sulfidation corrosion mitigation coating 14 from the substrate 12, as shown in FIG. 4, one or more of the indicator oxide particles 18 from the indicator layer 16 remain within the damaged area 20, which allows for easier inspection and detection of damaged areas 20 on the substrate. Indeed, upon visual inspection of the article 10, the indicator oxide particles 18 remaining with the damaged area 20 can fluoresce under a suitable light emitting source, allowing for easier visual detection of damaged areas.

Figure 5:
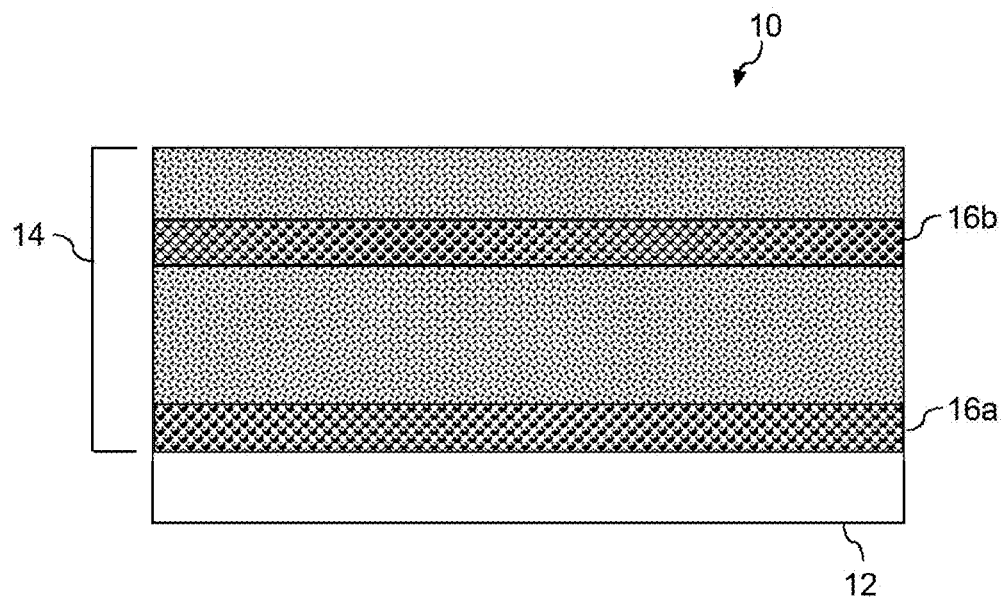
FIG. 5 illustrates an article having the coating disclosed herein containing one or more indicator oxide layers.

Referring now to FIG. 5, an article 10 is shown having a metal alloy substrate 12 with a sulfidation corrosion mitigation coating 14 thereon. The sulfidation corrosion mitigation coating 14 includes one or more indicator layers 16a, 16b containing one or more indicator oxides. In certain embodiments, indicator layer 16a may be adjacent to the substrate 12, while indicator layer 16b may be closer to the surface of the sulfidation corrosion mitigation coating 14. Indicator layers 16a and 16b include an increased concentration of indicator oxides as compared to other areas of the coating 14. For example, in certain embodiments the indicator layers 16a,16b are spaced apart from each other such that one or more layers of sulfidation corrosion mitigation material is between indicator layer 16a and indicator layer 16b. In some embodiments, the coating layer(s) between indicator layer 16a and 16b may contain sulfidation corrosion mitigation material and optionally a binder. In certain embodiments, the coating layer(s) between indicator layer 16a and 16b may be substantially free of indicator oxides.

Figure 6:
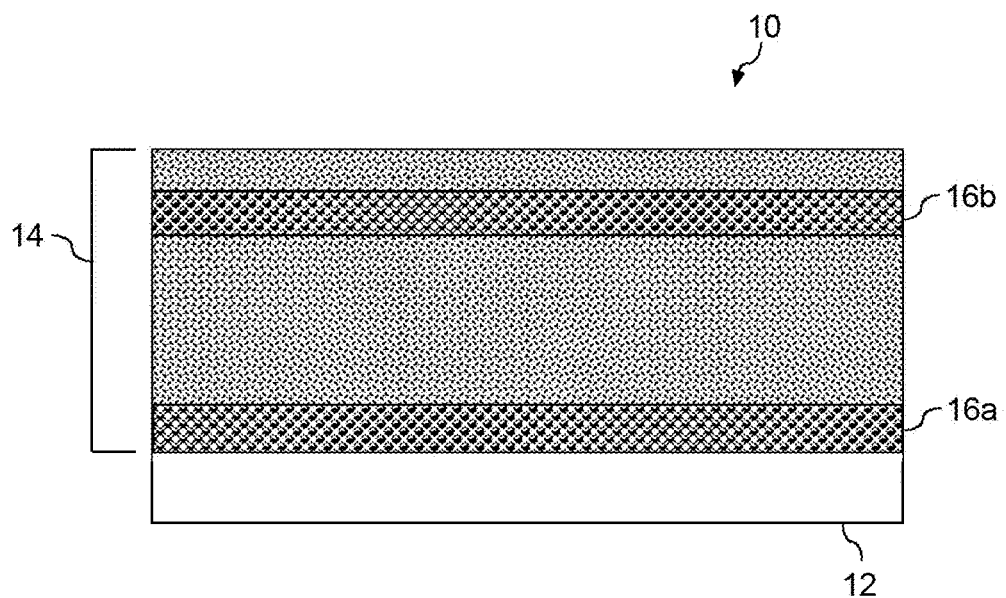
FIG. 6 illustrates an article having the coating disclosed herein containing one or more indicator oxide layers.

Referring now to FIG. 6, as portions of the sulfidation corrosion mitigation coating 14 are worn off during use of the article 10, indicator layer 16b becomes closer in proximity to the outer surface of the sulfidation corrosion mitigation coating 14. Thus, as the coating become worn in certain areas, indicator layer 16b is visible under a light emitting source under the worn areas, thus providing the ability to easily measure the wear or life of the coating during inspection. In certain embodiments, indicator layer 16a comprises indicator oxides capable of emitting fluorescence that is different from the fluorescence of the indicator oxides of indicator layer 16b. Utilizing different indicator oxides in this manner, allows for the visual detection and identification of worn patches of coating and substrate damage. For example, visual detection of the indicator oxides of indicator layer 16b indicates a worn area of the coating, while visual detection of the indicator oxides of indicator layer 16a indicates a damaged area on the substrate 12. Thus, utilization of two different indicator oxides in layers 16a and 16b allows for inspection and detection of multiple issues.

In another application (not shown) different indicator layers may be used as part of an abradable wear coating and, as such, allow for inspection and estimation of remaining coating thickness. In another application where the coated component is not easily removed for inspection, wear debris from different indicator layers, containing different indicator oxides, can be used as tracers and examined ex situ to determine the remaining thickness of the coating.

Also provided herein are methods for inspecting an article. The method includes exposing a surface of the article having the sulfidation corrosion mitigation coating disclosed herein to an environment comprising a sulfur corrosive; and utilizing one or more light emitting devices to inspect the article to identify damage to the article or to identify worn areas of the coating. The one or more light emitting devices can include any device capable of emitting ultraviolet light, such as UV-A light.

Further aspects of the invention are provided by the subject matter of the following clauses:

A wear or ablative coating, comprising; a binder; a wetting agent; and a plurality of indicator oxide nanoparticles.

The coating of any preceding clause, wherein the plurality of indicator oxide nanoparticles comprises europium oxide.

The coating of any preceding clause, wherein the binder comprises an aluminum phosphate.

The coating of any preceding clause, wherein the wetting agent comprises organic phosphate esters.

The coating of any preceding clause, wherein the coating comprises an indicator layer having an increased concentration of indicator oxide nanoparticles.

The coating of any preceding clause, wherein the indicator layer is comprised of indicator oxide nanoparticles capable of emitting a different fluorescence from the binder or the wetting agent.

A sulfidation corrosion mitigation coating, comprising: a sulfidation corrosion mitigation material; a binder; a wetting agent; and a plurality of indicator oxide nanoparticles; wherein the coating comprises a first indicator layer having an increased concentration of indicator oxide nanoparticles.

The coating of any preceding clause, wherein the sulfidation corrosion mitigation material comprises cerium oxide, or noble metal decorated cerium oxide, or any combination thereof.

The coating of any preceding clause, wherein the cerium oxide comprises a dopant selected from Gd, Y, La, Sm, Ca, Mg, Ba, Sr, Sc, Pr, Yb, Nd, Ho, Dy, Er, and any combination thereof.

The coating of any preceding clause, wherein the noble metal comprises Pt, Pd, or a combination thereof.

The coating of any preceding clause, wherein the indicator oxide nanoparticles comprise europium oxide.

The coating of any preceding clause, wherein the binder comprises an aluminum phosphate.

The coating of any preceding clause, comprising a second indicator layer having an increased concentration of indicator oxide particles.

The coating of any preceding clause, wherein the first indicator layer is comprised of indicator oxide nanoparticles that are different from the indicator oxide nanoparticles of the second indicator layer.

The coating of any preceding clause, wherein the coating has a thickness of from about 1 μm to about 30 μm.

An article comprising: a metal alloy substrate having a surface; and a sulfidation corrosion mitigation coating on the surface; wherein the sulfidation corrosion mitigation coating comprises, a binder, sulfidation corrosion mitigation material, a plurality of indicator oxide nanoparticles, and a wetting agent, wherein the sulfidation corrosion mitigation coating comprises a first indicator layer containing indicator oxide nanoparticles disposed on the surface of the metal alloy substrate, wherein the first indicator layer includes an increased amount of indicator oxide nanoparticles as compared to the sulfidation corrosion mitigation material.

The article of any preceding clause, wherein the sulfidation corrosion mitigation material comprises oxide nanoparticles that are catalytic to the decomposition of sulfur containing materials.

The article of any preceding clause, wherein the sulfidation corrosion mitigation coating comprises one or more layers disposed on the first indicator layer comprising the sulfidation corrosion mitigation material.

The article of any preceding clause, wherein the indicator oxide nanoparticles comprise cerium oxide.

The article of any preceding clause, wherein the sulfur corrosion mitigation coating comprises a second indicator layer having an increased concentration of indicator oxide particles.

A method for inspection of an article, comprising: exposing a surface of the article having a sulfidation corrosion mitigation coating thereon to an environment having a sulfur corrosive, wherein the sulfidation corrosion mitigation coating includes an indicator layer having an increased concentration of a plurality of indicator oxide nanoparticles disposed on the surface of the article; and utilizing one or more light emitting devices to inspect the article to identify damage to the article or to identify worn areas of the coating.

This written description uses examples to describe the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A sulfidation corrosion mitigation coating, comprising:
   a layer of a sulfidation corrosion mitigation material that is catalytic to decomposition of sulfur-containing compounds to mitigate corrosion of a surface from sulfur-containing compounds, the layer of the sulfidation corrosion mitigation material comprising a binder, a first indicator oxide, and the sulfidation corrosion mitigation material; and
   a first indicator layer disposed beneath the layer of the sulfidation corrosion mitigation material, the first indicator layer comprising:
      a binder;
      a wetting agent; and
      a second indicator oxide, wherein the second indicator oxide comprises a plurality of indicator oxide nanoparticles;
   wherein the first indicator layer has an increased concentration of any indicator oxide relative to the layer of the sulfidation corrosion mitigation material such that the first indicactor layer fluoresces upon removal of the layer of the sulfidation corrosion mitigation material, and
   wherein the sulfidation corrosion mitigation coating has a thickness of 1 μm to 15 μm.

2. The sulfidation corrosion mitigation coating of claim 1, wherein the sulfidation corrosion mitigation material comprises cerium oxide, a noble metal decorated cerium oxide, or any combination thereof.

3. The sulfidation corrosion mitigation coating of claim 2, wherein the cerium oxide comprises a dopant selected from Gd, Y, La, Sm, Ca, Mg, Ba, Sr, Sc, Pr, Yb, Nd, Ho, Dy, Er, or any combination thereof.

4. The sulfidation corrosion mitigation coating of claim 2, wherein the noble metal comprises Pt, Pd, or a combination thereof.

5. The sulfidation corrosion mitigation coating of claim 1, wherein the indicator oxide nanoparticles comprise europium oxide.

6. The sulfidation corrosion mitigation coating of claim 1, wherein the binder comprises an aluminum phosphate.

7. The sulfidation corrosion mitigation coating of claim 1, further comprising a second indicator layer having an increased concentration of indicator oxide particles than the layer of the sulfidation corrosion mitigation material.

8. The sulfidation corrosion mitigation coating of claim 7, wherein the second indicator layer is comprised of indicator oxide nanoparticles capable of emitting a different fluorescence from the binder or the wetting agent.

9. The sulfidation corrosion mitigation coating of claim 7, wherein the first indicator layer is comprised of indicator oxide nanoparticles that are different from the indicator oxide nanoparticles of the second indicator layer.

10. The sulfidation corrosion mitigation coating of claim 1, wherein the wetting agent comprises organic phosphate esters.

11. The sulfidation corrosion mitigation coating of claim 1, wherein the first indicator layer is comprised of indicator oxide nanoparticles capable of emitting a different fluorescence from the binder or the wetting agent.

12. The sulfidation corrosion mitigation coating of claim 1, wherein the sulfidation corrosion mitigation material comprises oxide nanoparticles that are catalytic to the decomposition of sulfur containing materials.

13. The sulfidation corrosion mitigation coating of claim 1, wherein the sulfidation corrosion mitigation coating comprises one or more layers disposed on the first indicator layer comprising the sulfidation corrosion mitigation material.

14. The sulfidation corrosion mitigation coating of claim 1, wherein the sulfidation corrosion mitigation material comprises cerium oxide, the binder comprises an aluminum phosphate, and the indicator oxide nanoparticles comprise europium oxide.

15. An article comprising:
   a metal alloy substrate having a surface; and
   the sulfidation corrosion mitigation coating of claim 1 on the surface of the metal alloy substrate.

16. The article of claim 15, wherein the sulfidation corrosion mitigation coating comprises one or more layers disposed on the first indicator layer comprising the sulfidation corrosion mitigation material.

17. The article of claim 15, wherein the indicator oxide nanoparticles comprise cerium oxide.

18. The article of claim 15, wherein the sulfidation corrosion mitigation coating comprises a second indicator layer having an increased concentration of indicator oxide particles.

\* \* \* \* \*